United States Patent [19]

Hirviniemi

[11] Patent Number: 5,802,285

[45] Date of Patent: Sep. 1, 1998

[54] WIDE AREA NETWORK (WAN) INTERFACE FOR A TRANSMISSION CONTROL PROTOCOL/INTERNET PROTOCOL (TCP/IP) IN A LOCAL AREA NETWORK (LAN)

[75] Inventor: Seppo Hirviniemi, Helsinki, Finland

[73] Assignee: ICL Personal Systems Oy, Helsinki, Finland

[21] Appl. No.: 948,602

[22] Filed: Oct. 10, 1997

Related U.S. Application Data

[63] Continuation of Ser. No. 689,240, Aug. 6, 1996, abandoned, which is a continuation of Ser. No. 375,176, Jan. 18, 1996, abandoned, which is a continuation of Ser. No. 67,579, May 28, 1993, abandoned.

[30] Foreign Application Priority Data

May 29, 1992 [FI] Finland .................. 922484

[51] Int. Cl.$^6$ .................................. G06F 13/00
[52] U.S. Cl. .................. 395/200.8; 395/200.6; 370/401
[58] Field of Search ............... 395/200.47, 200.48, 395/200.49, 200.6, 200.62, 200.8, 680, 681, 682, 500; 370/401, 469, 903, 911

[56] References Cited

U.S. PATENT DOCUMENTS

| | | | |
|---|---|---|---|
| 4,901,312 | 2/1990 | Hui et al. | 370/403 |
| 5,021,949 | 6/1991 | Morten et al. | 345/200.61 |
| 5,159,592 | 10/1992 | Perkins | 370/338 |
| 5,179,554 | 1/1993 | Lomicka et al. | 370/257 |
| 5,251,205 | 10/1993 | Callon et al. | 370/392 |
| 5,251,213 | 10/1993 | Videlock et al. | 370/403 |
| 5,309,437 | 5/1994 | Perlman et al. | 370/401 |
| 5,426,637 | 6/1995 | Derby et al. | 370/401 |

FOREIGN PATENT DOCUMENTS

A465201 1/1992 European Pat. Off. .

OTHER PUBLICATIONS

"Architecture and Design of an Open Systems LAN/WAN Gateway" Johansen et al, IEEE, 1988, pp. 112–119.
"Performance Analysis of a LAN/WAN Bridging Architecture" Rodrigues et al, IEEE, 1989, pp. 0646–0650.
"Some Experience with LAN Interconnection via Frame Relaying" Lamont et al, IEEE, 1989, pp. 21–24.
Examiner's Search Report re GB 9311059.1 (1 p.) Aug. 18, 1993 United Kingdom.
IBM Technical Disclosure Bulletin, vol.36, No. 06B, pp. 61–67, Jun. 1993.
Proc. IEEE, vol. 79, No.2, Inspec. Abstract B 91033950 (1 pg.) Feb. 1991 U.S.A.

*Primary Examiner*—Parshotam S. Lall
*Assistant Examiner*—Viet Vu
*Attorney, Agent, or Firm*—Fitch, Even, Tabin & Flannery

[57] ABSTRACT

The invention relates to a method for interfacing a transmission control protocol/internet protocol (TCP/IP) area network (LAN) to a wide are network via a MAC manager. The TCP/IP software uses a lower-level address resolution protocol (ARP) protocol to find physical network addresses corresponding to logical internet protocol (IP) addresses, and a lower-level IP protocol to transfer useful traffic in IP data packets. In the invention, the media access control (MAC) manager of the wide area network (3) simulates operation complying with the ARP protocol towards the TCP/IP software, and transmits and receives only IP data packets over the wide area network (3) in a manner specific to the wide area network.

6 Claims, 4 Drawing Sheets

WIDE AREA NETWORK (WAN) INTERFACE FOR A TRANSMISSION CONTROL PROTOCOL/INTERNET PROTOCOL (TCP/IP) IN A LOCAL AREA NETWORK (LAN)

This application is a continuation, of application Ser. No. 08/689,240 filed Aug. 6, 1996, which is a continuation of Ser. No. 08/375,176 filed Jan. 18, 1996, which is a continuation of Ser. No. 08/067,579 filed May 28, 1993 all now abandoned.

FIELD OF THE INVENTION

The invention relates to interfacing a TCP/IP (transmission control protocol/internet protocol) software of a local area network (LAN) to a wide area network (WAN) via a media access control (MAC) manager when the TCP/IP software utilizes a lower-level ARP (address resolution protocol) protocol to adapt physical network addresses to logical IP addresses, and a lower-level IP protocol to transfer useful traffic in IP data packets.

BACKGROUND OF THE INVENTION

Computers can be interconnected to form various computer networks generally called local area networks (LAN). Ethernet and Token Ring are the most typical types of LAN. The equipment connected to the LAN may be a workstation, a server, a bridge, a router, etc. Computer application programs may use various network protocols to communicate with each other over the LAN. One such network protocol is TCP/IP (Transmission Control Protocol/Internet Protocol), which is used widely in equipments from different manufacturers especially in the UNIX operating system but also in the MS-DOS and OS/2 operating systems. TCP/IP is a protocol family consisting of a number of layered protocols complying with the Open Systems Interconnection (OSI) model specified by the International Standards Organization (ISO). The most important OSI layers are the transmission protocol layer (layer 4) and the network layer (layer 3). When the IP protocol is used in a LAN (Ethernet, Token Ring, FDDI), an ARP (Address Resolution Protocol) is needed to find a physical LAN address (or more correctly an MAC address) corresponding to the requested IP address. Typically, each computer maintains an ARP database from which it can look up the physical destination address for to the logical IP destination address. If the physical destination address cannot be found in the ARP database, the computer transmits a special ARP request message to the LAN so as to request a computer identifying the IP address to transmit the respective physical destination address.

It may also be advantageous that a workstation remote from the LAN (a remote workstation), or another LAN, can be connected to the LAN. Due to the long distance it is thereby necessary to make the interconnection via a so-called wide area network (WAN). The simplest form of the WAN is an asynchronous modem link from the remote workstation to a network element. On the other hand, the WAN may also be established over a transfer network. The ARP protocol is not needed over the WAN as the WAN does not contain LAN addresses for which the respective IP addresses should be found. A remaining problem is that the TCP/IP software designed for the LAN always attempts to use the ARP protocol to find out the correspondence between the addresses. TCP/IP software utilizing an MAC-level interface cannot therefore operate directly over the WAN.

DISCLOSURE OF THE INVENTION

The object of the present invention is to enable a computer using a TCP/IP software designed for a LAN to be interfaced to a WAN, thus enabling a more efficient utilization of WANs than previously.

According to the invention, the MAC manager of the WAN simulates operation complying with the ARP protocol towards the TCP/IP software, and transmits and receives only IP data packets over the WAN in a WAN-specific manner.

The basic idea of the invention is that the WAN MAC manager controlling traffic over the WAN simulates operation LAN workstation complying with the ARP protocol towards the TCP/IP application program. Accordingly, when the TCP/IP application program transmits an ARP request message to the MAC manager so as to request a physical destination address (network address) corresponding to the IP destination address, the MAC manager responds with an appropriate reply message which, however, contains an arbitrary physical address for said IP address. The TCP/IP application assumes to have received a reply and an appropriate address from another computer connected to the LAN and starts to transfer useful data with the other computer in compliance with the IP protocol. It thereby transmits IP data packets provided with its own address and the above-mentioned arbitrary physical address. The MAC manager identifies the IP packets, removes the above-mentioned physical addresses and other possible LAN control data and transmits only the IP data packet over the WAN in a WAN-specific manner. Correspondingly, the IP data packets are extracted from data received over the WAN and provided with the physical address of the TCP/IP application and the above-mentioned arbitrary address, and then transmitted to the TCP/IP application program. The WAN is thus all the time transparent to the TCP/IP application, and the operation of the TCP/IP application is equal to communication over a normal LAN.

The invention is very easy and economical to implement as modifications and extra functions are required only in the MAC manager. The TCP/IP applications and WANs communication can be accomplished in a conventional way.

BRIEF DESCRIPTION OF THE DRAWINGS

In the following the invention will be described in more detail by means of illustrating embodiments with reference to the attached drawings, in which.

DETAILED DESCRIPTION OF THE DRAWINGS

Figure 1:
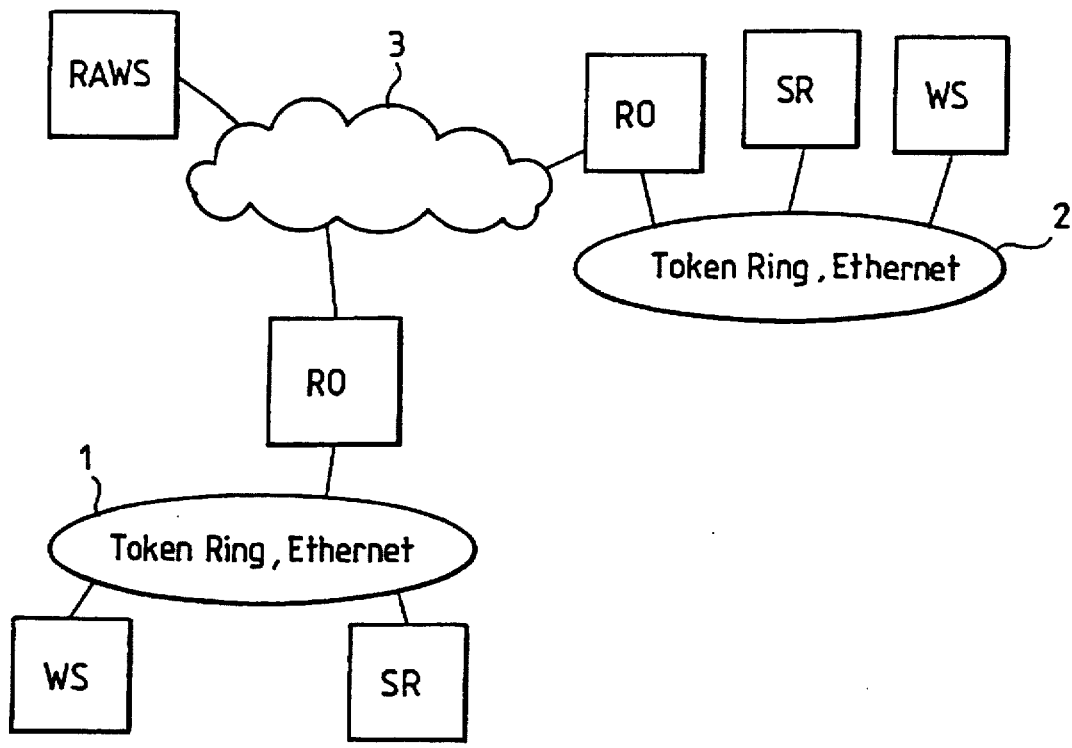
FIG. 1 illustrates schematically a LAN interconnected with another LAN or another remote workstation over a WAN according to the invention.

The invention will be described below by way of example with reference to Ethernet LANs, but the invention may also be applied to other types of LANs, such as Token Ring. FIG. 1 shows two separate Ethernet LANs 1 and 2 both having a plurality of associated workstations WS and servers SR (FIG. 1 shows only a few units for the sake of clarity). The workstations WS may be any computers, such as the MIK-ROMIKKO 4 from ICL Personal Systems Ltd. The servers SR may be e.g. printers, disk drives, routers RO or workstation servers implemented by computers. The workstations and servers are typically supported by the UNIX, OS/2 or DOS operating system.

The routers RO connect together the geographically separate LANs 1 and 2 by means of a WAN. The WAN 3 may be any connection, such as a telephone line, X.25 line, leased line, asynchronous link, SNA network. In addition, an asynchronous remote workstation RAWS is connected to both LANs over the WAN 3.

Figure 2:
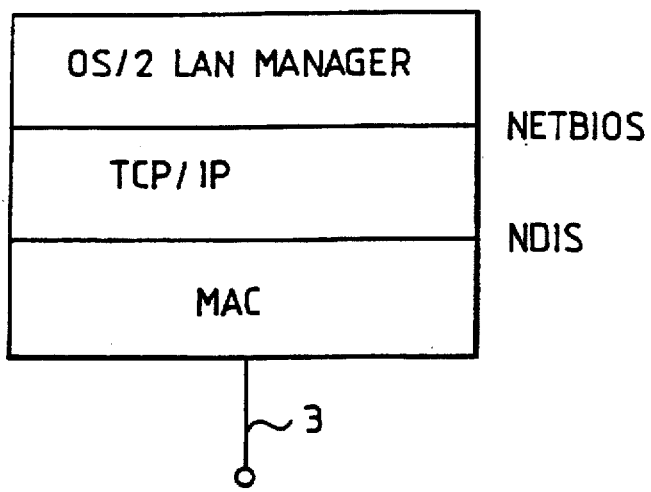
FIG. 2 illustrates a workstation provided with a MAC manager according to the invention.

In the preferred embodiment of the invention, the network software of the remote workstation RAWS is such as shown in FIG. 2. As used herein the network software refers to system software needed to make the workstations and servers communicate with each other. There are two main types of network software: network operating systems and telecommunication software. The network operating system is usually an application program in a server and requires its own counterpart at the workstation. The network operating system is usually on the highest ISO level of hierarchy. Network operating-system softwares include e.g. IBM PC Lan Program, OS/2 Lan Manager, and ICL MS Lan Manager.

Telecommunication software is intended for intra-network communication. All workstations and servers connected to the network have to use the same protocol. The remote workstation RAWS according to the invention uses TCP/IP telecommunication software connected to the network operating-system software via a NETBIOS interface. The TCP protocol is on the fourth level of ISO hierarchy, and the IP protocol is on the third level of ISO hierarchy. The TCP/IP software uses the IP protocol on the lower level of hierarchy (OSI layer 3) to transfer useful traffic (payload) in IP data packets. It also uses the ARP (Address Resolution Protocol) to adapt the physical network addresses to the logical addresses used by the IP protocol. The ARP is described in the standard RFC-826: An Ethernet Address Resolution Protocol. The IP is described in the standard RFC-894: Standard for the Transmission of IP Datagrams over Ethernet Networks. Typically each computer maintains an ARP database from which it can look up an appropriate physical destination address on the basis of the logical IP destination address. If the physical destination address cannot be found in the ARP database, the computer transmits a special ARP request message to the LAN so as to request a computer identifying the IP address to transmit the respective physical destination address.

The next lower OSI layer (layer 2) uses an MAC (Media Access Control) manager software which controls traffic over the serial WAN 3. The TCP/IP software and the MAC software are interconnected via an NDIS interface. The NDIS interface is described in the Microsoft/3Com Network Driver Interface specification. Below the MAC manager there is a physical layer (OSI 1) comprising a physical transfer path and a physical interface to it.

Figure 4:
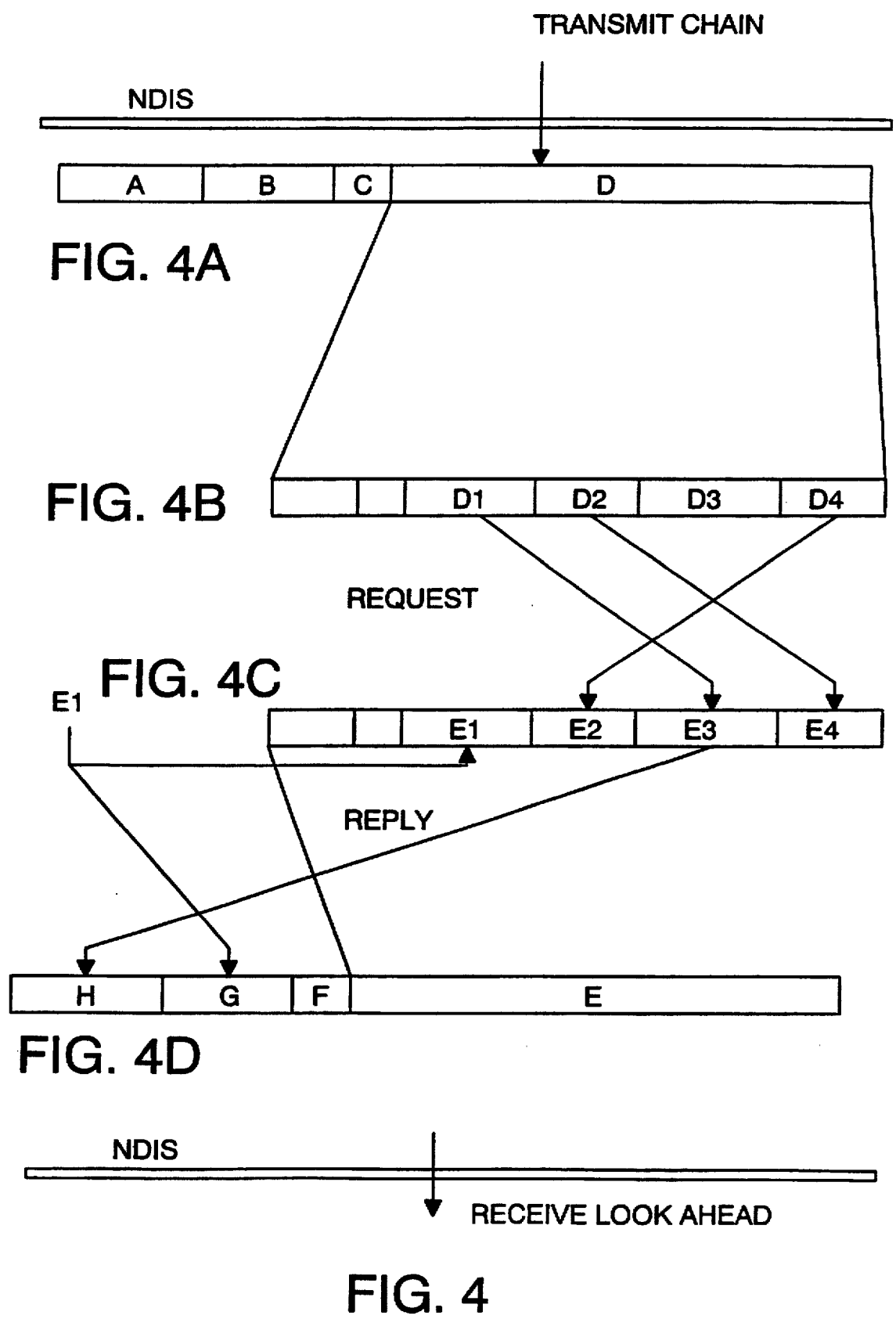
FIGS. 4A, 4B, 4C and 4D referred collectively as FIG. 4 illustrate the simulation of an ARP protocol.

The TCP/IP software assumes that the network utilized on the transfer network level is a LAN (in this specific case Ethernet) while the MAC manager, in fact, operates in a WAN environment. According to the invention, the MAC manager simulates operation of LAN workstation complying with the ARP protocol and the Ethernet frame format in communication towards the TCP/IP software so that the TCP/IP software assumes that it is connected to the Ethernet network. An example of this ARP simulation is shown in FIG. 4, where the MAC manager responds to the ARP request. The TCP/IP software transmits the ARP Request packet shown in FIG. 4A to the MAC manager by the NDIS command TransmitChain. The packet is transmitted in order to find out the physical address corresponding to the requested IP address. As shown in the figure, the ARP Request packet contains the field A of the physical destination address (in this specific case an empty location for the requested physical destination address), the field B of the physical source address (the physical address of the TCP/IP software), the type field C of the ARP message, and the ARP frame D. As shown in FIG. 4B, the ARP frame D contains e.g. a physical source address D1, an IP source address D2, a physical destination address D3 (unknown) and an IP destination address D4. The MAC manager assembles an ARP Reply frame E shown in FIG. 4C from the received ARP Request frame D. An arbitrary 6-byte constant is inserted to the frame E as a physical source address E1; the IP source address E2 will be the IP destination address D4 of the frame D; the physical destination address E3 will be the destination address D1 of the frame D; and the IP destination address E4 will be the IP source address D2 of the frame D. The NDIS command ReceiveLookAhead illustrated in FIG. 4D is then formed by incorporating the ARP type field F, the physical source address G (equal to E1) and the physical destination address H (equal to E4) to the ARP frame E.

Figure 5:
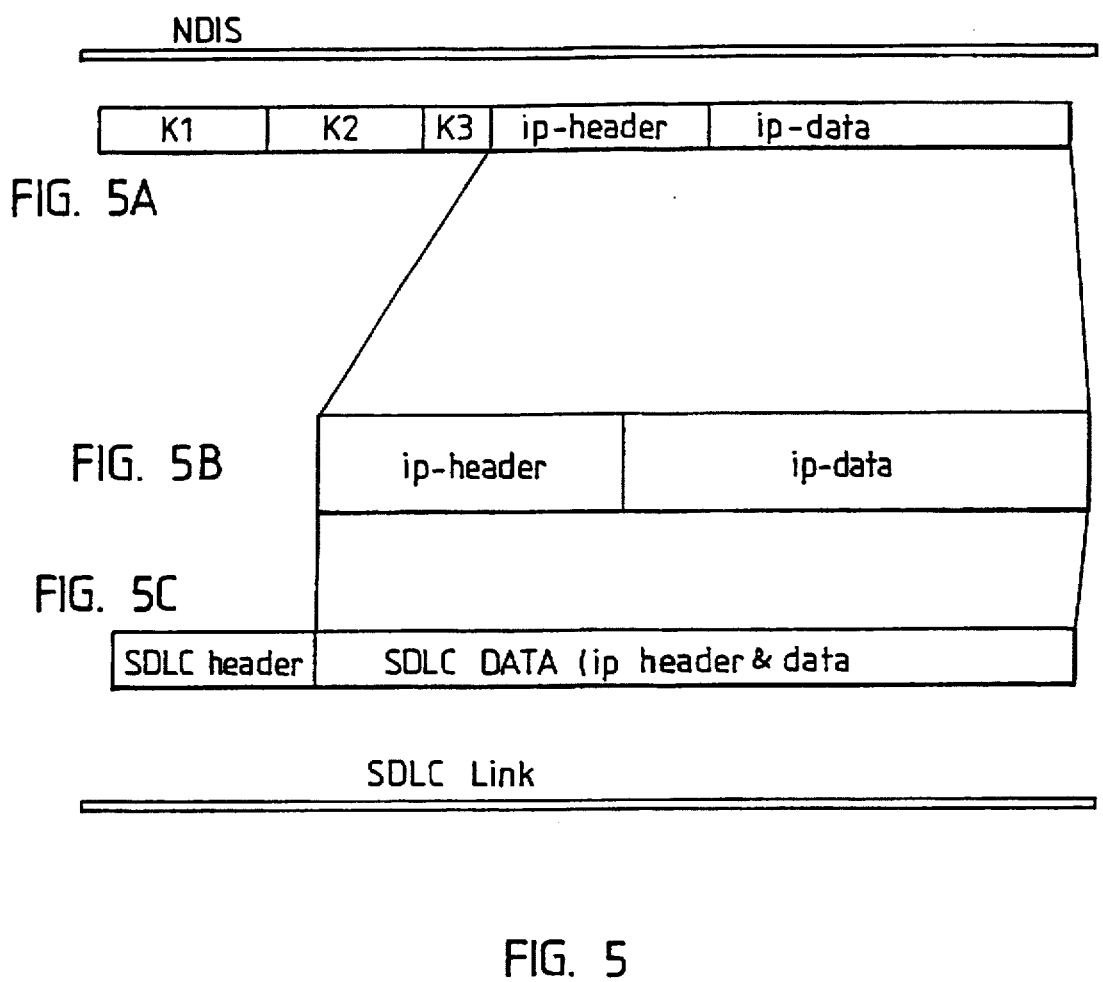
FIGS. 5A, 5B, and 5C referred collectively as FIG. 5 illustrate the transfer of useful traffic.

After having received the message of FIG. 4D, the TCP/IP software assumes that the ARP request has been successful and starts to transmit IP packets to the MAC manager, which is illustrated in FIG. 5. FIG. 5A shows a packet K transmitted by the TCP/IP software via the NDIS interface, the LAN control data comprising a physical destination address K1 (equal to D1), a physical source address K2 (equal to D3), an IP type K3 and an IP packet containing the header IP-Header and IP data. The MAC manager extracts the LAN control data from the IP packet, as shown in FIG. 5B, and inserts the IP packet in the data field of the SDLC packet, which is preceded by the SDLC-Header when the WAN is an SDLC link (Synchronous Data Link Control) e.g. in an SNA network (Systems Network Architecture), as shown in FIG. 5C. If the WAN 3 is an X.25 link, the IP packet is transmitted in the data field of the X.25 packet. If the WAN 3 is an asynchronous connection, the IP packet is SLIP encoded before being transmitted. SLIP encoding is specified in the standard RFC-1055: Non-Standard for Transmission of IP Datagrams over Serial Lines.

Correspondingly, when SDLC data packets are received from the WAN 3, the MAC manager executes procedures inverse to those shown in FIG. 5: the MAC manager extracts the WAN control data (SDLC-Header) from the IP data packets and provides IP data packets with the LAN control data and then transmits the packets to the TCP/IP software.

Figure 3:
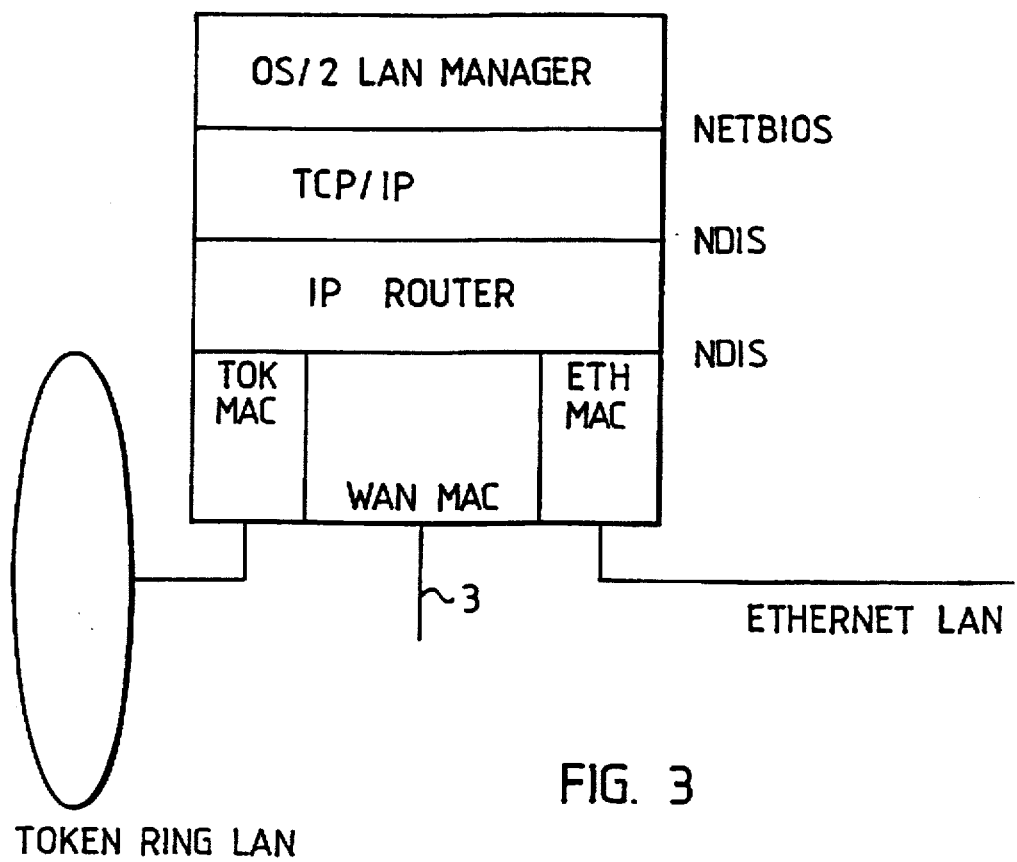
FIG. 3 illustrates a router provided with a MAC manager according to the invention.

FIG. 3 illustrates the implementation of the invention in a server computer operating as a router such as the router RO in FIG. 1. In the embodiment of FIG. 1, the TCP/IP software is connected to the IP router via the NDIS interface. The IP router in turn is connected via another NDIS interface to the WAN MAC manager, the Token Ring LAN MAC manager, and the Ethernet LAN manager. The IP router is able to route normal traffic complying with the ARP and IP protocols between the MAC managers and between the MAC managers and the TCP/IP software. Communication between the TCP/IP software and the WAN MAC manager takes place as described above with reference to FIG. 4.

The figures and the description related to them are only intended to illustrate the present invention. In its details, the method according to the invention may vary within the scope of the attached claims.

I claim:

1. A method of interfacing a transmission control protocol/internet protocol (TCP/IP) software designed for a local area network (LAN) to a wide area network (WAN), the WAN having a media access control (MAC) manager, the TCP/IP software utilizing a lower-level address resolution protocol (ARP) to find physical network addresses corresponding to logical internet protocol (IP) addresses, and the TCP/IP utilizing a lower-level IP protocol to transfer useful traffic in IP data packets, comprising the steps of:

simulating, by said MAC manager, operation complying with the ARP protocol between said MAC manager and said TCP/IP software in the direction towards said TCP/IP software, and transmitting IP data packets over the WAN, from and to said MAC manager, in a manner appropriate to the WAN rather than the LAN, and wherein the simulating step comprises the following steps:

requesting, by said TCP/IP software, a physical address for a component of the WAN whose IP address is known by transmitting a request message complying with said ARP protocol to said MAC manager, said request message containing, as a physical source address, the physical address of a component of the LAN; and as an IP source address, the IP address of said component of the LAN; and as an IP destination address, said IP address of said component of the WAN, and transmitting, by said MAC manager, to said TCP/IP software a reply message complying with said ARP protocol and containing, as a physical source address, an arbitrary constant corresponding to said physical address of said component of the WAN; as an IP source address, said IP address of said component of the WAN; as a physical destination address, said physical address of said component of the LAN; and as an IP destination address, said IP address of said component of the LAN.

2. A method according to claim 1, wherein useful traffic is transferred from the LAN to the WAN by the steps comprising:

providing IP data packets at the LAN with LAN control data;

transmitting, by said TCP/IP software, the IP data packets provided with the LAN control data to said MAC manager, extracting, by said MAC manager, said LAN control data from said transmitted IP data packets;

providing, by said MAC manager, said IP data packets with WAN control data; and transmitting, by said MAC manager, over said WAN said IP data packets provided with WAN control data.

3. A method according to claim 1, wherein useful traffic is transferred from the WAN to the LAN by the steps comprising:

providing IP data packets at the WAN with WAN control data;

transmitting the IP data provided with the WAN control data to said MAC manager;

extracting, by said MAC manager, said WAN control data from said transmitted IP data packets;

providing, by said MAC manager, said IP data packets with LAN control data; and transmitting, by said MAC manager, over said LAN said IP data packets provided with LAN control data.

4. A method according to claim 1, wherein said WAN is a synchronous data link control (SDLC) link, and said IP data packet is transmitted in a data field of an SDLC frame.

5. A method according to claim 1, wherein said WAN is an X.25 link, and said IP data packet is transmitted in a data field of an X.25 data packet.

6. A method according to claim 1, wherein said WAN is an asynchronous link, and said IP data packet is SLIP encoded prior to transmission.

* * * * *

UNITED STATES PATENT AND TRADEMARK OFFICE
CERTIFICATE OF CORRECTION

PATENT NO. : 5,802,285
DATED : Sep. 1, 1998
INVENTOR(S) : Seppo HIRVINIEMI

It is certified that error appears in the above-indentified patent and that said Letters Patent is hereby corrected as shown below:

On the title page,
item [63] line 2, following "Ser., No. 375,176" change "Jan. 18, 1996," to --Jan. 18, 1995,--.

Signed and Sealed this

Twenty-fifth Day of May, 1999

Attest:

Q. TODD DICKINSON

*Attesting Officer*          *Acting Commissioner of Patents and Trademarks*